(12) United States Patent
Hazen et al.

(10) Patent No.: US 9,952,556 B2
(45) Date of Patent: Apr. 24, 2018

(54) METHOD FOR SINGLE-WRITE HOLOGRAPHIC IMAGING

(71) Applicants: John Hazen, South Hadley, MA (US); Larry Hoague, Feeding Hills, MA (US)

(72) Inventors: John Hazen, South Hadley, MA (US); Larry Hoague, Feeding Hills, MA (US)

(73) Assignee: HAZEN PAPER COMPANY, Holyoke, MA (US)

( * ) Notice: Subject to any disclaimer, the term of this patent is extended or adjusted under 35 U.S.C. 154(b) by 662 days.

(21) Appl. No.: 13/901,689

(22) Filed: May 24, 2013

(65) Prior Publication Data

US 2014/0009806 A1   Jan. 9, 2014

Related U.S. Application Data

(60) Provisional application No. 61/668,202, filed on Jul. 5, 2012.

(51) Int. Cl.
  *G03H 1/28* (2006.01)
  *G03H 1/00* (2006.01)
  (Continued)

(52) U.S. Cl.
  CPC ......... *G03H 1/0011* (2013.01); *G03H 1/2249* (2013.01); *G03H 1/28* (2013.01);
  (Continued)

(58) Field of Classification Search
  CPC ...... G03H 1/0011; G03H 1/2249; G03H 1/28; G03H 1/30; G03H 1/04–1/0402; G03H 1/0443; G03H 1/0476; G03H 1/0866–1/0891; G03H 1/26; G03H 1/2645–1/265; G03H 1/268;
  (Continued)

(56) References Cited

U.S. PATENT DOCUMENTS 6,330,088 B1 * 12/2001 Klug .................. G03H 1/20
                                                         359/10
6,822,769 B1 * 11/2004 Drinkwater .......... G03H 1/0011
                                                         283/86

(Continued)

OTHER PUBLICATIONS

Masahiro Yamaguchi ; Takahiro Koyama ; Hideaki Endoh ; Nagaaki Ohyama ; Susumu Takahashi and Fujio Iwata "Development of a prototype full-parallax holoprinter", Proc. SPIE 2406, Practical Holography IX, 50 (Apr. 12, 1995); doi:10.1117/12.206244; http://dx.doi.org/10.1117/12.206244.*

(Continued)

*Primary Examiner* — Derek S Chapel
(74) *Attorney, Agent, or Firm* — Grogan, Tuccillo & Vanderleeden, LLP

(57) ABSTRACT

A method for single-write holographic imaging involves determining a layout of a plurality of holographic images on a substrate, the plurality of holographic images including at least a first holographic image having a first parameter set and a second holographic image having a second parameter set, inputting the parameter sets into a database and controlling an imaging apparatus to image the first and second holographic images on the substrate in a single session to create an integrated holographic pattern.

14 Claims, 2 Drawing Sheets

(51) Int. Cl.
*G03H 1/22* (2006.01)
*G03H 1/30* (2006.01)
*G03H 1/04* (2006.01)

(52) U.S. Cl.
CPC ....... *G03H 1/30* (2013.01); *G03H 2001/0482* (2013.01); *G03H 2210/56* (2013.01)

(58) Field of Classification Search
CPC ............... G03H 1/2685; G03H 1/2695; G03H 2001/303–2001/306; G03H 2001/0478–2001/0484; G03H 2001/2605–2001/2615; G03H 2001/2655–2001/2675; G03H 2001/0482; G03H 2001/0208–2001/0232; G03H 2001/0833; G03H 2001/026; G03H 2210/56–2210/562
USPC ............................ 359/1, 2, 9, 22, 24, 25, 35
See application file for complete search history.

(56) References Cited

U.S. PATENT DOCUMENTS

| | | | |
|---|---|---|---|
| 7,167,286 B2* | 1/2007 | Anderson | G11B 7/0065 359/22 |
| 8,749,862 B2* | 6/2014 | Kitamura | G03H 1/08 359/9 |
| 9,715,426 B2* | 7/2017 | Curtis | G06F 11/1004 |
| 2011/0199658 A1* | 8/2011 | Blanche | G03H 1/02 359/3 |

OTHER PUBLICATIONS

Rakuljic et al., "Optical data storage by using orthogonal wavelength-multiplexed volume holograms", Optics Letters, Oct. 15, 1992, vol. 17, No. 20, pp. 1471-1473.*

* cited by examiner

METHOD FOR SINGLE-WRITE HOLOGRAPHIC IMAGING

CROSS REFERENCE TO RELATED APPLICATIONS

This application claims the benefit of U.S. Provisional Application No. 61/668,202, filed Jul. 5, 2012, entitled "METHOD FOR SINGLE-WRITE HOLOGRAPHIC IMAGING", hereby incorporated by reference in its entirety.

FIELD OF THE INVENTION

The present invention relates generally to a system and method for holographic imaging and, more particularly, to a system and method for creating a plurality of different holographic images on a single sheet.

BACKGROUND OF THE INVENTION

Holograms have long been used for security to indicate that a document or product is authentic and to increase the attractiveness of goods such as lottery and entertainment/sporting event tickets, product packaging such as for DVDs, event programs, calendars and magazines. Indeed, methods and apparatuses for creating holographic optical elements on a recording medium, i.e., substrate, to create an overall optical illusion have been known in the art for some time. Generally, a hologram is created by splitting a laser into two beams, an object beam and a reference beam. The object beam is spread, reflected off of an object and directed onto the recording medium. The reference beam travels directly onto the recording medium. When the two laser beams reach the recording medium, their light waves intersect and interfere with each other. It is this interference pattern that is imprinted on the recording medium to produce the hologram on the substrate.

A more recent development in holographic imaging technology has been the ability to create two or more different holographic images on a single sheet. Such known methods utilize a process/technique called mechanical recombination, where a first holographic image is printed on a substrate and that image is physically combined with a substrate having another holographic image. This process involves physical/manual manipulation of the holographic printing/imaging apparatus between the printing of each individual holographic image, and physical combining of the images in order to produce a sheet having multiple different holographic images.

As will be readily appreciated, such mechanical recombination is slow and laborious, and may suffer from misalignment or registration issues. In particular, such a process may result in improper registration or placement of the different holographic images with respect to one another or with respect to other areas of the sheet which are configured to accept subsequent ink printing or other holographic image. Moreover, holographic sheets produced through mechanical recombination often do not have a smooth surface, as the edges of each holographic image can be felt by running a finger over the surface, which is undesirable.

In view of these shortcomings, there is a need in the industry for a method of creating a sheet having a plurality of different holographic images that obviates the need for mechanical recombination, and which is faster and more efficient than known processes.

SUMMARY OF THE INVENTION

It is an object of the present invention to provide a system and method for holographic imaging.

It is another object of the present invention to provide a method for holographic imaging whereby a sheet having multiple different holographic images can be created in a single session on an imaging apparatus.

It is another object of the present invention to provide a method for holographic imaging which does not utilize mechanical recombination.

It is another object of the present invention to provide a method for holographic imaging that obviates the need to manually reconfigure or retool the apparatus or sheet between the printing of each holographic image.

It is another object of the present invention to provide a method for holographic imaging that substantially reduces or eliminates misalignment.

It is another object of the present invention to provide a method for holographic imaging that allows for the creation of new holographic image patterns.

An embodiment of the inventive method for single-write holographic imaging involves determining a layout of a plurality of holographic images on a substrate, the plurality of holographic images including at least a first holographic image having a first parameter set and a second holographic image having a second parameter set, inputting the parameter sets into a database and controlling an imaging apparatus to image the first and second holographic images on the substrate in a single session to create an integrated holographic pattern.

These and other objects, features and advantages of the present invention will become apparent in light of the detailed description of the best mode embodiment thereof, as illustrated in the accompanying drawings.

DETAILED DESCRIPTION OF THE PREFERRED EMBODIMENT

Figure 1:
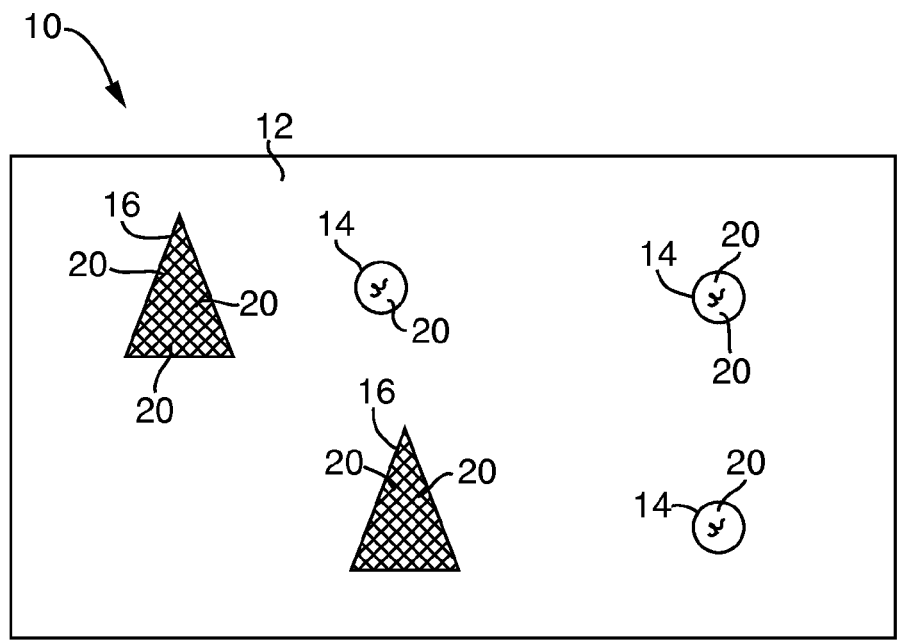
FIG. 1 illustrates an exemplary integrated holographic pattern produced by the method for single-write holographic imaging according to the present invention.

Referring to FIG. 1, an integrated holographic pattern 10 having multiple different holographic images is shown. As shown therein, the integrated holographic pattern 10 is printed on a substrate 12, such as a holographic or photoresistive film, and includes multiple different holographic images, such as first holographic image 14 and a second holographic image 16. As will be readily appreciated, the integrated holographic pattern 10 may be made up of any number of repeating or different holographic images. The holographic images 14, 16 may be of any shape or have any desired image or artwork, and may produce different visual effects such as color changing, three dimensional imagery, inlaid text, etc., as is known in the art.

Each holographic image 14, 16 is constructed from an array of holographic optical elements 20, i.e., pixels, each having a parameter set. The parameter set includes the angle of incidence and rotation of the object beam and reference beam with respect to the substrate necessary to produce the holographic optical element 20 of the particular optical image being printed, as well as the spacing of the point of interference of the object and reference beams from the substrate 10. As will be readily appreciated, each holographic optical element 20 has a particular parameter set that is utilized by an imaging apparatus to produce the particular color and visual effect that makes up the particular holographic image 14, 16.

More generally, each holographic image has a parameter set associated therewith, this parameter set being made up of the combined parameter sets of each of the holographic optical elements 20 that make up the different holographic images 14, 16. For example, first holographic image 14 has a first parameter set and second holographic image 16 has a second parameter set, the second parameter set of the second holographic image 16 being different from the first parameter set of the first holographic image 14.

Typically, utilizing existing holographic imaging technologies and apparatuses, each different holographic image, e.g., holographic images 14, 16, would be imaged separately and then combined with other holographic images utilizing mechanical recombination or like processes to produce an integrated holographic pattern. In particular, each different holographic image would typically be imaged separately, whereby the imaging apparatus is configured to image a holographic image having a single parameter set. The apparatus would then have to be disabled and manually reconfigured or retooled in order to image a holographic image having a different parameter set. This disabling and retooling/reconfiguring would be repeated until each of the holographic images were printed. As will be readily appreciated, such a process is laborious and inefficient.

Figure 2:
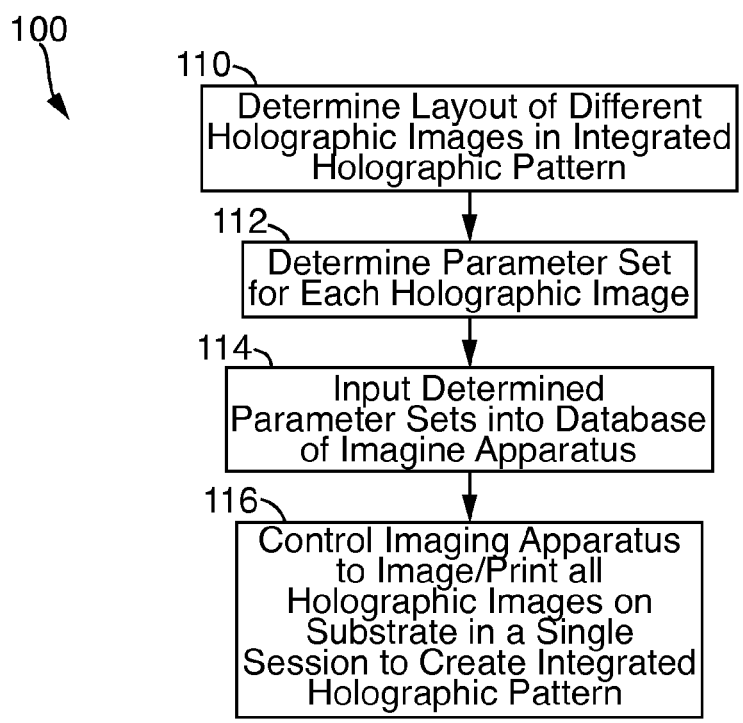
FIG. 2 is a flowchart illustrating a method for single-write holographic imaging, according to an embodiment of the present invention.

Turning now to FIG. 2, a method for single-write holographic imaging 100 according to the present invention, which may be utilized to produce the integrated holographic pattern 10 of FIG. 1, is illustrated. First, artwork for the integrated holographic pattern 10 is created using any known pixelizing software, such as bitmap imaging software. In particular, as shown at step 110, the particular holographic images and the layout, including exact location, of the holographic images in the integrated holographic pattern is selected and input into a computer of a holographic imaging apparatus. Once the integrated holographic pattern 10 made up of different holographic images 14, 16 is input into the computer of the imaging apparatus, the parameter set for each holographic image 14, 16 is determined, at step 112. More specifically, the parameter set for each holographic optical element 20 that constitutes each holographic image 14, 16 is determined.

At step 114, the parameter sets for each holographic image 14, 16 is then input into a database. In an embodiment, the database is configured to control the imaging apparatus to image/print the holographic images 14, 16. In particular, the database is configured to control the imaging apparatus to adjust the angle of incidence and rotation of the object and reference beams with respect to the substrate, as well as spacing of the point of interference of the beams from the surface of the substrate 12. Next, at step 116, the apparatus is controlled by the database to image/print all of the holographic images 14, 16 on the substrate 12, in a single session, to create the integrated holographic pattern 10. As used herein, "single session" is intended to mean imaging all of the holographic images 14, 16 that make up the integrated holographic pattern 10, including all of the holographic images having different parameter sets, without manipulating elements of the imaging apparatus between imaging/printing of the different holographic images.

Importantly, as the parameter set for each holographic optical element 20 of each holographic optical image 14, 16 is determined and input into the database prior to initiation of printing, the entire integrated holographic pattern 10, i.e., all of the holographic images, can be printed in a single session on an imaging apparatus without the need to retool or reconfigure the apparatus between the printing of different holographic images. In this respect, the method of holographic imaging of the present invention is a single-write method for holographic imaging whereby a plurality of different holographic images having different holographic optical elements (i.e., lens, color changing, burst, white motion, etc.) can be printed on a single sheet, in a single session, on an imaging apparatus. As will be readily appreciated, the present invention is equally applicable to any particular type of holographic imaging carried out by any type of existing apparatus, such as common split-beam holographic imaging apparatuses and the like that utilize lenses and crystals to split a laser beam into an object beam and reference beam and to manipulate the angle and rotation thereof to create an interference pattern on a substrate. In particular, whatever type of holographic imaging technology or apparatus is utilized to produce the holographic images, the method of the present invention is adaptable to any such technology.

Notably, the single-write method according to the present invention provides a heretofore unknown efficiency in holographic imaging, as manual reconfiguration of an apparatus between the printing of each different holographic image, or each holographic optical element, is not necessary. In addition, the single-write method for holographic imaging according to the present invention also significantly reduces or eliminates registration issues. In particular, holographic images must be located precisely on the substrate pursuant to tight tolerances required for downstream ink printing. Because these downstream printers often cannot adjust the location of the subsequent ink printing, the location of the holographic images must be exact, especially in relation to the areas of the substrate which are configured for ink printing.

With existing methods, inaccuracies of the location of the holographic images are quite common, as the apparatus is physically retooled between each "pass." Therefore, upon each pass there is the possibility of introducing misalignment or magnifying previous misalignments. In contrast to known methods, the single-write method of the present invention substantially reduces or eliminates misalignment by printing the entire integrated holographic pattern in a single session without retooling or reconfiguration. Importantly, by eliminating the need to retool between each image or optical element, the source of the majority of registration/alignment issues is removed.

In addition to the above-described advantages, the method for single-write holographic imaging according to the present invention also allows for the creation of heretofore unknown holographic patterns. One such pattern or visual effect that can be produced utilizing the method of the present invention is a dispersed white light optical effect or "white motion" hologram. In particular, it has been discovered that by laying one holographic image substantially on top of another holographic image and controlling the angle of incidence of the imaging beams to a certain angle, the scattering of light by the resultant holographic image is such that a brilliant white can be observed by a viewer as opposed to discrete wavelengths of light reflected by existing holographic patterns that impart a specific color other than white.

Figure 3:
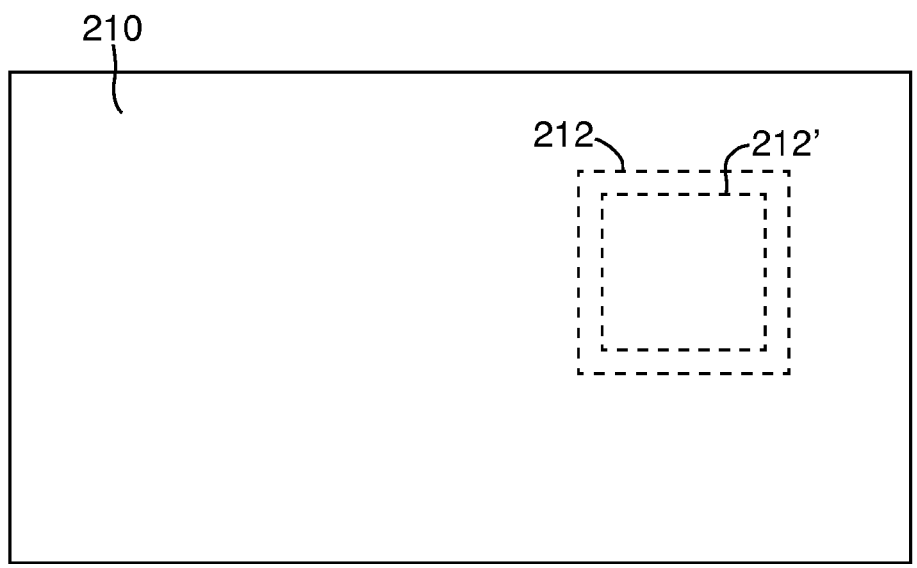
FIG. 3 illustrates the production of dispersed white light optical effect utilizing the method for single-write holographic imaging of FIG. 1.

With reference to FIG. 3, a dispersed white light optical effect is produced on a substrate 210 by imaging a first holographic image having a first parameter set upon a first discrete portion 212 of the substrate 210. A second holographic image having a second parameter set is then imaged upon a second discrete portion 212' of the substrate, wherein the second discrete portion 212' of the substrate 210 is in substantially the same location as the first discrete portion 212. As shown therein the first and second holographic images are essentially imaged on top of one another. In an embodiment, the imaging of multiple holograms on top of one another to produce a desired optical effect may be referred to as "controlled multiple exposure." As discussed above, the particular optical effect produced by the controlled multiple exposure of the substrate is dependent upon the particular parameter sets of the holographic images. In an embodiment, the first parameter set of the first holographic image is different from the second parameter set of the second holographic image. In the preferred embodiment, the angle of incidence of the imaging beam utilized to produce the dispersed white light optical effect is substantially low. As discussed above, it has been discovered that imaging multiple holographic images on top of one another in a controlled manner, with a controlled, low angle of incidence, produces an optical effect that scatters light in such a way that a brilliant white "motion" effect is seen by a viewer.

As discussed above, new holographic images and patterns such as the dispersed white light optical effect may be produced utilizing the single-write method for holographic imaging according to the present invention. As also discussed above, these images may be produced according to the method of the present invention utilizing, for example, known split-beam holographic imaging apparatuses and the like that utilize lenses and crystals to split a laser beam into an object beam and reference beam and to manipulate the angle and rotation thereof to create an interference pattern on a substrate. Importantly, however, the method of the present is not limited to any single type of holographic imagining apparatus, but is broadly applicable to any holographic imaging apparatus or technology, without departing from the broader aspects of the present invention.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A method for single-write holographic imaging, said method comprising the steps of:
   determining a layout of a plurality of holographic images on a substrate, said plurality of holographic images including at least a first holographic image having a first parameter set and a second holographic image having a second parameter set, said second parameter set being different from said first parameter set;
   inputting said first parameter set and said second parameter set into a database; and
   controlling an imaging apparatus having an object beam and a reference beam to image said first and second holographic images on said substrate in a single session to create an integrated holographic pattern;
   wherein said first parameter set includes parameters determining, the angle of incidence and rotation of said object beam and said reference beam with respect to said substrate, and the spacing of the point of interference of said object beam and said reference beam for each pixel in said first hologram image, and second parameter set includes parameters determining the angle of incidence and rotation of said object beam and said reference beam with respect to said substrate, and the spacing of the point of interference of said object beam and said reference beam for each pixel in said second hologram image;
   wherein said first holographic image and said second holographic image are printed onto said substrate sequentially;
   wherein said step of controlling an imaging apparatus to image said first and second holographic images on said substrate includes imaging said first holographic image on a discrete portion of said substrate and imaging said second holographic image on an entirety of substantially said same discrete portion of said substrate as said first holographic image, in order to produce a combination holographic image.

2. The method according to claim 1, wherein:
   said single session includes imaging said first and second holographic images on said substrate without manually manipulating elements of said imaging apparatus between imaging of said first holographic image and said second holographic image.

3. The method according to claim 2, wherein:
   said holographic images include a plurality of holographic optical elements.

4. The method according to claim 1, wherein:
   said imaging apparatus is a split-beam holographic imaging apparatus.

5. A method for single-write holographic imaging, said method comprising the steps of:
   providing a holographic imaging apparatus capable of imaging a plurality of holographic images on a substrate;
   controlling said apparatus via an integrated computer network, said computer network having manual input capabilities;
   determining a layout of an integrated image, said integrated image having holographic and non-holographic elements;
   determining at least a first holographic image having a first parameter set and a second holographic imaging having a second parameter set, said second parameter set being different from said first parameter set;
   wherein said computer network controls said holographic imaging apparatus so as to imprint said first and second different holographic images on said substrate sequentially in a single-write process with an object beam and a reference beam, said single-write process being accomplished without manual manipulation of imaging elements of said holographic imaging apparatus,
   wherein said holographic imaging apparatus imprints said first and said second holographic images in combination of said non-holographic elements.

6. The method according to claim 5, wherein:
   each of said holographic images themselves are comprised of one or more holographic optical elements;
   wherein a holographic parameter set of each of said holographic optical elements include one or more of angle of a reference beam and an object beam, rotation of said reference beam and object beam and the spacing of a point of interference of said reference beam and object beam from said substrate.

7. The method according to claim 6, wherein:
said holographic imaging apparatus is a split-beam holographic imaging apparatus.

8. The method according to claim 6, wherein:
said step of controlling said holographic imaging apparatus so as to imprint said first and second different holographic images on said substrate includes imaging said first holographic image on a discrete portion of said substrate and imaging said second holographic image on substantially said same discrete portion of said substrate as said first holographic image.

9. A method of creating a dispersed white light optical effect using holographic imaging, said method comprising the steps of:
providing a single imaging laser as part of a holographic imaging apparatus;
arranging said holographic imaging apparatus to produce an object beam and a reference beam so as to be capable of imaging holographic images on a substrate;
imaging a first holographic image having a first parameter set upon a discrete portion of said substrate; and
imaging a second holographic image having a second parameter set upon said substrate after said first holographic image is imprinted, said imaging of said second holographic image occurring on an entirety of said substantially same discrete portion of said substrate as said first holographic image;
wherein said first and second different holographic images are imprinted on said substrate in a single-write process to produce a combination holographic image, said single-write process being accomplished without manual manipulation of imaging elements of said holographic imaging apparatus.

10. The method according to claim 9, wherein:
each of said holographic images is comprised of a plurality of holographic optical elements each having a parameter set.

11. The method according to claim 10, wherein:
said parameter set includes an angle of incidence of said reference beam on said substrate.

12. The method according to claim 11, wherein:
said angle of incidence is substantially low such that a dispersed white-light design is viewable.

13. The method according to claim 10, wherein:
said parameter set includes one or more of rotation of said reference beam and an object beam and the spacing of a point of interference of said reference beam and object beam from said substrate.

14. The method according to claim 9, wherein:
said first parameter set of said first holographic image is different from said second parameter set of said second holographic image.

* * * * *